Patented Feb. 28, 1928.

1,660,337

UNITED STATES PATENT OFFICE.

WALTER KARRER, OF BASEL, SWITZERLAND, ASSIGNOR TO THE HOFFMANN-LA ROCHE CHEMICAL WORKS, OF NEW YORK, N. Y., A CORPORATION OF NEW YORK.

QUININE SALTS OF HYDROXYPHENYL-ARSONIC ACIDS AND PROCESS FOR MAKING SAME.

No Drawing. Application filed July 22, 1926, Serial No. 124,295, and in Switzerland November 6, 1925.

The quinine salts of hydroxyphenyl-arsonic acids, which possess valuable therapeutic properties in the treatment of tropical diseases such as malaria, dysentery, etc., are characterized by easy crystallization. They are rather difficultly soluble in cold, more easily soluble in hot water. They further dissolve in alcohol and dilute mineral acids. The aqueous solutions react neutrally with litmus. By adding alkali quinine is precipitated. They are to be used as medicines.

The quinine salts of hydroxyphenyl-arsonic acids are obtained by treating the free hydroxyphenyl-arsonic acids with quinine or the salts of hydroxyphenyl-arsonic acids with soluble quinine salts. By hydroxyphenyl-arsonic acids I mean compounds containing as substituents only the hydroxyl group and the arsonic acid group.

Example 1.

2.85 parts of the mono-sodium salt of para-hydroxyphenyl-arsonic acid are dissolved in tenfold the quantity of water and to this is added a solution of 3.96 parts of quinine chlorhydrate in thirtyfold the quantity of water. A thick precipitate is thereby produced. This precipitate is separated from the mother liquor and the salt thus obtained is dissolved in hot water and then re-crystallized. The quinine salt of para-hydroxyphenyl-arsonic acid crystallizes in fine colorless needles which melt at 177–178° C.

The following graphical formula illustrates the reaction which takes place:

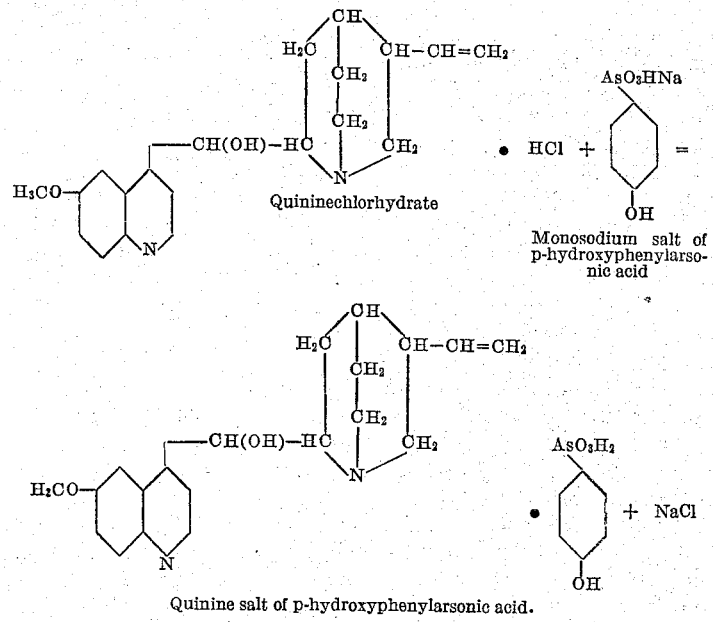

Quinine salt of p-hydroxyphenylarsonic acid.

Example 2.

2.18 parts of para-hydroxyphenyl-arsonic acid and 3.78 parts of quinine are heated in thirtyfold the quantity of water during 8 hours in the water-bath. Upon cooling the quinine salt of hydroxyphenyl-arsonic acid is precipitated in fine needles. After dissolving these needles in hot water and effecting re-crystallization, the same salt is obtained as the one described in Example 1.

The following graphical formula illustrates the reaction which take place:

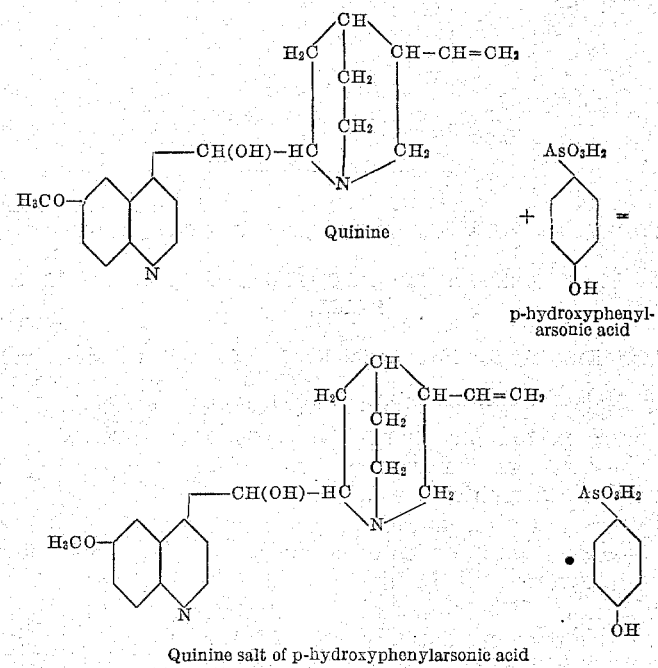

Quinine salt of p-hydroxyphenylarsonic acid

It is obvious from the above examples and formulæ that the acid and the quinine combine in the same way whether both are free or both are present in the form of their salts; in fact, when, for instance, mono-sodium salt of para-hydroxyphenyl-arsonic acid is treated with quinine chlorhydrate as in Example 1, sodium chlorid is first formed, leaving the free acid and the free quinine to react with one another, just as do the free acid and the free quinine in Example 2, so that even if the salts are brought together the reaction is really one between the free acid and the free quinine. Therefore, when I speak in my claims of permitting the acid to react with the quinine, I intend to include in such expression not only the reaction between the free acid and the free quinine, but also the reaction between their respective salts.

I claim:

1. As new articles of manufacture the quinine salts of hydroxyphenyl-arsonic acids which may be obtained by treating hydroxyphenyl-arsonic acids with quinine or the salts of hydroxyphenyl-arsonic acids with soluble quinine salts, said acids containing as substituents only the hydroxyl group and the arsonic acid group, the new salts possessing valuable therapeutic properties, being characterized by easy crystallization, dissolving rather difficultly in cold, more easily in hot water, being further soluble in alcohol and dilute mineral acids, the aqueous solutions reacting neutrally with litmus, the addition of alkali causing quinine to be precipitated.

2. As a new article of manufacture the quinine salt of para-hydroxyphenol-arsonic acid which may be obtained by treating para-hydroxyphenyl-arsonic acid with quinine or the salts of para-hydroxyphenyl-arsonic acid with soluble quinine salts, said acid containing as substituents only the hydroxyl group and the arsonic acid group, the new salt possessing valuable therapeutic properties, melting at 177–178° C., being characterized by easy crystallization, dissolving rather difficultly in cold, more easily in hot water, being further soluble in alcohol and dilute mineral acids, the aqueous solution reacting neutrally with litmus, the addition of alkali causing quinine to be precipitated.

3. The process for the manufacture of quinine salts of hydroxyphenyl-arsonic acids which consists in allowing hydroxyphenyl-arsonic acids containing as substituents only the hydroxyl group and the arsonic acid group to react with quinine.

4. The process for the manufacture of quinine salts of hydroxyphenyl-arsonic acids which consists in allowing the free hydroxyphenyl-arsonic acids containing as substituents only the hydroxyl group and the arsonic acid group to react with free quinine.

5. The process for the manufacture of quinine salts of hydroxyphenyl-arsonic acids which consists in allowing the salts of hydroxyphenyl-arsonic acids containing as substituents only the hydroxyl group and the arsonic acid group to react with soluble quinine salts.

In witness whereof I have hereunto set my hand.

Dr. WALTER KARRER.